United States Patent
Cho et al.

(10) Patent No.: US 8,369,282 B2
(45) Date of Patent: Feb. 5, 2013

(54) RANGING BY MOBILE STATION IN FEMTO SYSTEM

(75) Inventors: Hee Jeong Cho, Anyang-Si (KR); Ki Seon Ryu, Sungnam-Si (KR); Jin Sam Kwak, Gunpo-Si (KR); Hyun Woo Lee, Anyang-Si (KR); Yong Ho Kim, Inchen-Si (KR); Young Soo Yuk, Seoul (KR)

(73) Assignee: LG Electronics Inc., Seoul (KR)

( * ) Notice: Subject to any disclaimer, the term of this patent is extended or adjusted under 35 U.S.C. 154(b) by 382 days.

(21) Appl. No.: 12/829,604

(22) Filed: Jul. 2, 2010

(65) Prior Publication Data

US 2011/0002303 A1  Jan. 6, 2011

Related U.S. Application Data

(60) Provisional application No. 61/222,942, filed on Jul. 3, 2009, provisional application No. 61/250,873, filed on Oct. 13, 2009, provisional application No. 61/253,822, filed on Oct. 21, 2009, provisional application No. 61/260,400, filed on Nov. 12, 2009, provisional application No. 61/292,851, filed on Jan. 6, 2010.

(30) Foreign Application Priority Data

Mar. 29, 2010 (KR) .................. 10-2010-0027869

(51) Int. Cl.
*H04W 4/00* (2009.01)
(52) U.S. Cl. ......... 370/331; 370/338; 370/349; 370/350
(58) Field of Classification Search .................. 370/331, 370/338, 349, 350
See application file for complete search history.

(56) References Cited

U.S. PATENT DOCUMENTS

| | | | |
|---|---|---|---|
| 2005/0195791 A1 | 9/2005 | Sung et al. | |
| 2008/0159427 A1 | 7/2008 | Kang et al. | |
| 2008/0259859 A1* | 10/2008 | Cordeiro et al. | 370/329 |
| 2009/0185543 A1* | 7/2009 | Chen et al. | 370/338 |
| 2010/0002631 A1* | 1/2010 | Cho et al. | 370/328 |
| 2010/0120438 A1* | 5/2010 | Kone et al. | 455/444 |
| 2011/0002279 A1* | 1/2011 | Yang et al. | 370/329 |

* cited by examiner

*Primary Examiner* — Hassan Kizou
*Assistant Examiner* — Toan Nguyen
(74) *Attorney, Agent, or Firm* — Birch, Stewart, Kolasch & Birch, LLP

(57) ABSTRACT

A ranging method in a mobile station of a femto system is disclosed. According to the present invention, a femto base station enables non-synchronized ranging channel (NS-RCH) information to be carried on S-SFH SP1. A mobile station receives S-SFH and then determines whether a base station is a femto base station. If the base station is the femto base station, the mobile station is able to perform a periodic ranging using the NS-RCH information within the S-SFH as well as an initial/handover ranging.

12 Claims, 3 Drawing Sheets

RANGING BY MOBILE STATION IN FEMTO SYSTEM

CROSS REFERENCE TO RELATED APPLICATIONS

This application claims the benefit of the Korean Patent Application No. 10-2010-0027869, filed on Mar. 29, 2010, which is hereby incorporated by reference as if fully set forth herein.

This application claims the benefit of U.S. Provisional Application Nos. 61/222,942, 61/250,873, 61/253,822, 61/260,400, and 61/292,851, filed on Jul. 3, 2009, Oct. 13, 2009, Oct. 21, 2009, Nov. 12, 2009, and Jan. 6, 2010, which are hereby incorporated by reference as if fully set forth herein.

BACKGROUND OF THE INVENTION

1. Technical Field

The present invention relates to a ranging method in a mobile station of a femto system. Although the present invention is suitable for a wide scope of applications, it is particularly suitable for a mobile station to perform a ranging on a femto base station in a mobile communication including a macro base station, the femto base station and the mobile station.

2. Background Art

Generally, IEEE 802.16m system includes legacy support functionality and is able to support IEEE 802.16e system. In case of a mixed mode, a base station (e.g., a macro base station, a femto base station, etc.) is operable using a frame including a WirelessMAN OFDMA region (hereinafter named an L region) supporting a legacy mobile station (i.e., IEEE 802.16e mobile station) and an improved wireless interface region (hereinafter named an M region) supporting IEEE 802.16m mobile station. Meanwhile, the base station is operable in a mode for supporting not a legacy mobile station but IEEE 802.16m mobile station only.

In a system supporting IEEE 802.16m mobile station only, a macro base station except a femto base station and a relay can use such a ranging channel structure for initial/handover ranging as shown in FIG. 1.

FIG. 1 is a diagram of a ranging channel structure available for a macro base station and a relay to perform initial ranging and handover ranging. Particularly, FIG. 1(a) shows Format 0 and FIG. 1(b) shows Format 1. In this case, the ranging channel can occupy contiguous frequency bands (i.e., a localized bandwidth) corresponding to 1 subband.

In FIG. 1, $T_{RCP}$ indicates a ranging cyclic prefix region and $T_{RP}$ indicates a ranging preamble region. As mentioned in the foregoing description, the ranging channel structure shown in FIG. 1 is usable for a ranging of a non-synchronized mobile station, i.e., for an initial ranging and a handover ranging.

Configuration information on Format 0 and Forma 1 is shown in Table 1.

TABLE 1

| Format No. | $T_{RCP}$ | $T_{RP}$ | $\Delta f_{RP}$ |
|---|---|---|---|
| 0 | $k_1 \times T_g + k2 \times T_b$ | $2 \times T_b$ | $\Delta f/2$ |
| 1 | $3.5 \times T_g + 7 \times T_b$ | $8 \times T_b$ | $\Delta f/8$ |

In Table 1, $\Delta f$ indicates a subcarrier spacing, $T_b$ indicates a useful symbol duration of OFDMA, i.e., $Tb=1/\Delta f$, $T_g$ indicates a length of CP (cyclic prefix) of OFDMA, i.e., $T_g = G \cdot T_b$, and G indicates a ratio of a useful symbol duration to a CP duration. Meanwhile, $k_1$ and $k_2$ meet the following conditions.

$$K_1=(N_{sym}+1)/2 \text{ and } K_2=(N_{sym}-4)/2 \quad \text{[Formula 1]}$$

In Formula 1, $N_{sym}$ indicates the number of OFDMA symbols within a single AAI subframe.

Based on the above described structure, in mode for supporting IEEE 802.16m only, ranging channel allocation information (i.e., configuration index and subframe offset ($O_{SF}$)) is shown in Table 2, ranging code information (i.e., number $M_{ns}$ of cyclic shift codes per ZC root index) is shown in Table 3, and ranging preamble code partition information (i.e., $N_{IN}$ and $N_{HO}$) is shown in Table 4.

TABLE 2

| Configurations | The AAI subframe allocating Ranging channel |
|---|---|
| 0 | $O_{SF}{}^{th}$ UL AAI subframe in every frame |
| 1 | $O_{SF}{}^{th}$ UL AAI subframes in the first frame in every superframe |
| 2 | $O_{SF}{}^{th}$ UL AAI subframe in the first frame in every even numbered superframe, i.e.. mod(superframe number. 2) = 0 |
| 3 | $O_{SF}{}^{th}$ UL AAI subframe of the first frame in every $4^{-th}$ superframe. i.e. mod(superframe number. 4) = 0 |

TABLE 3

| index | 0 | 1 | 2 | 3 |
|---|---|---|---|---|
| $M_{ns}$ | 1 | 2 | 4 | 8 |

TABLE 4

| Partition Index | 0 | 1 | 2 | 3 | 4 | 5 | 6 | 7 | 8 | 9 | 0 | 11 | 12 | 13 | 14 | 15 |
|---|---|---|---|---|---|---|---|---|---|---|---|---|---|---|---|---|
| Number of initial ranging preamble codes. $N_{IN}$ | 8 | 8 | 8 | 8 | 16 | 16 | 16 | 16 | 24 | 24 | 24 | 24 | 32 | 32 | 32 | 32 |
| Number of handover ranging preamble codes. $N_{HO}$ | 8 | 16 | 24 | 32 | 8 | 16 | 24 | 32 | 8 | 16 | 24 | 32 | 8 | 16 | 24 | 32 |

A base station is able to transmit the informations shown in Tables 2 to 4 to a mobile station via S-SFH. As mentioned in the foregoing description, in a mode for supporting IEEE 802.16m only, since a base station transmit ranging channel information on initial ranging and handover ranging only via S-SFH, the ranging preamble code partition information, as shown in Table 4, includes the number ($N_{IN}$) of codes of a code group for the initial ranging and the number ($N_{HO}$) of codes of a code group for the handover ranging only.

Meanwhile, in a mode for supporting IEEE 802.16m only, a cyclic ranging channel can have the structure shown in FIG.

2 unlike the ranging channel for the initial ranging and the handover ranging shown in FIG. 1.

FIG. 2 is a diagram of a ranging channel structure for periodic ranging.

Referring to FIG. 2, in a periodic ranging channel, some of each OFDMA symbol region is copied as a cyclic prefix (hereinafter abbreviated CP) to a symbol head part. In FIG. 2, a length of a CP duration is represented as $T_g$ and a useful symbol duration amounting to the rest region of an OFDMA symbol duration except the CP duration is represented as $T_b$. As mentioned in the foregoing description, $T_b$ shown in FIG. 2 indicates $T_b=1/\Delta f$, $T_g$ indicates $T_g=G \cdot T_b$, and G indicates a ratio of a useful symbol duration to a CP duration.

Thus, the ranging channel information for the periodic ranging, the information necessary for code generation and information on a total number of codes available for a corresponding usage are delivered to mobile stations via AAI_SCD (advanced interface system configuration descriptor) message. Table 5 and Table 6 show information delivered via the AAI_SCD message.

TABLE 5

| index | Number of periodic ranging preamble codes, $N_{PE}$ |
|---|---|
| 0 | 8 |
| 1 | 16 |
| 2 | 24 |
| 3 | 32 |

TABLE 6

| Configurations | AAI subframe allocating ranging channel |
|---|---|
| 0 | $\mathrm{mod}(O_{SF} \div 1 \cdot N_{UL})^{th}$ UL AAI subframe in every frame |
| 1 | $\mathrm{mod}(O_{SF} \div 1 \cdot N_{UL})^{th}$ UL AAI subframe in the second frame in every superframe |
| 2 | $\mathrm{mod}(O_{SF} \div 1 \cdot N_{UL})^{th}$ UL AAI subframe in the second frame in every $4^{th}$ superframe. i.e., mod(superframe number. 4) = 0 |
| 3 | $\mathrm{mod}(O_{SF} \div 1 \cdot N_{UL})^{th}$ UL AAI subframe in the second frame in every $8^{th}$ superframe. i.e., mod(superframe number. 8) = 0 |

Table 5 shows code number information ($N_{PE}$) of a code group available as partition information of a ranging preamble code for periodic ranging. And, Table 6 shows ranging channel allocation information on a periodic ranging channel.

SUMMARY OF THE INVENTION

Accordingly, the present invention is directed to a ranging method in a mobile station of a femto system that substantially obviates one or more of the problems due to limitations and disadvantages of the related art.

Currently, a femto base station in a system configured to support IEEE 802.16m mobile station only does not use a ranging channel of a structure different in ranging usage but is assumed as using a mobile station ranging channel structure synchronized for the aforesaid periodic ranging shown in FIG. 2 for ranging of all usages (initial/handover/periodic). Since a cell serviced by a femto base station is smaller than a macro base station, it is able to support ranging (e.g., initial ranging, handover ranging, etc.) of a non-synchronized mobile station using a periodic ranging channel having a CP of a small length only.

As mentioned in the foregoing description, the ranging channel information for the periodic ranging is transmitted via the AAI_SCD message, which is sent after a mobile station has performed synchronization, instead of using S-SFH. Thus, the mobile station is able to execute an initial/handover ranging procedure only after having received the AAI_SCD message having a long transmission periodicity as well as S-SFH. Hence, a control plane access latency (This is a time consumed until a network entry procedure is completed) of the mobile station may become elongated. Moreover, if we consider that HO interruption time requirement requested by the IEEE 802.16m system is 27.5 ms, in case of a femto base station that has to perform a handover ranging after reception of the AAI_SCD message, data transmission/reception interrupted latency of a mobile station is unable to avoid being elongated considerably, whereby the aforesaid HO interruption time requirement of the IEEE 802.16m system is not met. Therefore, in the following description, proposed to solve the above mentioned latency problem is a method of transmitting ranging channel information on a femto base station via S-SFH.

Meanwhile, information unnecessary or unfit for mobile stations within a femto is included in the ranging channel information for the non-synchronized mobile station in a current S-SFH. Therefore, the demand for a method of minimizing downlink overhead and delay or latency of a mobile station according to transmission of S-SFH contents unnecessary in aspect of a femto system is rising.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of performing a ranging in a mobile station, which performs the ranging on a femto base station in a mobile communication system including a macro base station, the femto base station and the mobile station, includes the steps of receiving S-SFH (secondary superframe header) information, determining whether the S-SFH information relates to the femto base station, if the S-SFH information relates to the femto base station, obtaining information on a ranging channel for a synchronized mobile station from the S-SFH, and performing at least one selected from the group consisting of an initial ranging, a handover ranging and a periodic ranging on the femto base station using the information on the ranging channel for the synchronized mobile station.

Preferably, the mobile station uses the ranging channel for the synchronized mobile station for each of the initial ranging, the handover ranging and the periodic ranging.

More preferably, the information on the ranging channel for the synchronized mobile station includes ranging channel allocation information, start code information of the ranging channel and ranging code partition information.

In this case, the ranging channel allocation information includes an allocation periodicity of the ranging channel for the synchronized mobile station and subframe offset information of the ranging channel for the synchronized mobile station.

And, the ranging code partition information includes information on the code number (N) of a code group for the initial ranging, the code number (O) of a code group for the handover ranging, and the code number (M) of a code group for the periodic ranging.

Moreover, the ranging code partition information includes an index value within a table indicating a single index of each value of the code number (N) of the code group for the initial ranging, the code number (O) of the code group for the handover ranging, and the code number (M) of the code group for the periodic ranging.

To further achieve these and other advantages and in accordance with the purpose of the present invention, a mobile station device, which performs a ranging on a femto base station in a mobile communication system including a macro base station, the femto base station and the mobile station, includes an antenna configured to receive a signal from the femto base station, the antenna configured to transmit a signal to the femto base station and a processor configured to process the signal received via the antenna and the signal transmitted via the antennas, the processor determining whether S-SFH (secondary superframe header) information relates to the femto base station if receiving the S-SFH information, the processor obtaining information on a ranging channel for a synchronized mobile station from the S-SFH if the S-SFH information relates to the femto base station, the processor performing at least one selected from the group consisting of an initial ranging, a handover ranging and a periodic ranging on the femto base station using the information on the ranging channel for the synchronized mobile station.

Preferably, the mobile station device uses the ranging channel for the synchronized mobile station for each of the initial ranging, the handover ranging and the periodic ranging.

More preferably, the information on the ranging channel for the synchronized mobile station includes ranging channel allocation information, start code information of the ranging channel and ranging code partition information.

More preferably, the ranging channel allocation information includes an allocation periodicity of the ranging channel for the synchronized mobile station and subframe offset information of the ranging channel for the synchronized mobile station.

More preferably, the ranging code partition information includes information on the code number (N) of a code group for the initial ranging, the code number (O) of a code group for the handover ranging, and the code number (M) of a code group for the periodic ranging.

In this case, the ranging code partition information includes an index value within a table indicating a single index of each value of the code number (N) of the code group for the initial ranging, the code number (O) of the code group for the handover ranging, and the code number (M) of the code group for the periodic ranging.

It is to be understood that both the foregoing general description and the following detailed description are exemplary and explanatory and are intended to provide further explanation of the invention as claimed.

Advantageous Effects

According to embodiments of the present invention, it is able to minimize downlink overhead and delay or latency of a mobile station according to transmission of S-SFH contents unnecessary in aspect of a femto system.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Best Mode

Figure 1:
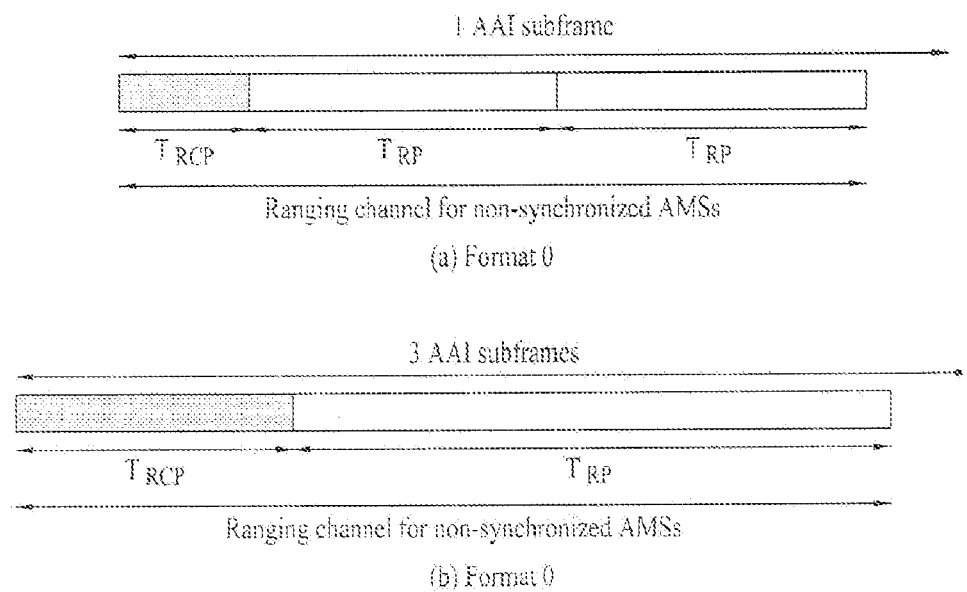
FIG. 1 is a diagram of a ranging channel structure available for a macro base station and a relay to perform initial ranging and handover ranging.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~ part' '~ functionality', '~ module' and the like means a unit for handling at least one function or operation, which can be implemented by software, hardware or combination thereof.

As mentioned in the foregoing description, according to one embodiment of the present invention, proposed is a method of minimizing a delay or latency of a mobile station in aspect of a femto system. For this, a femto base station according to the present embodiment is proposed to transmit ranging channel (S-RCH) information for a synchronized mobile station via S-SFH instead of ranging channel (NS-RCH) information for a non-synchronized mobile station. Therefore, the femto base station may not transmit the S-RCH information via AAI_SCD message.

A mobile station according to the present embodiment checks a femto indicator delivered via S-SFH or a secondary advanced (SA) preamble sequence soft partitioning information and is then able to determine whether a base station is a femto base station or not. If the base station is not the femto base station, the mobile station is able to determine that ranging channel informations delivered via S-SFH Sp1 are configured with NS-RCH channel information shown in Table 7.

TABLE 7

| Fields | Size [bits] |
| --- | --- |
| Allocation periodicity of the NS-RCH | 2 |
| Subframe offset of the NS-RCH | 2 |

TABLE 7-continued

| Fields | Size [bits] |
|---|---|
| Start RP code information of the NS-RCH | 4 |
| RP code partition information for the NS-RCH | 4 |
| Number of the cyclic shifted RP codes per root index for the NS-RCH | 2 |
| NS-RCH formats | 1 |

In Table 7, a non-synchronized ranging channel (NS-RCH) means a channel that is used for initial ranging and handover ranging.

Meanwhile, in case that a mobile station having received S-SFH determines that a base station having transmitted the S-SFH is a femto base station, it is able to determine that ranging channel informations delivered via S-SFH Sp1 are configured with the synchronized ranging channel information shown in Table 8 or Table 9.

TABLE 8

| Fields | Size [bits] |
|---|---|
| Allocation periodicity of the S-RCH | 2 |
| Subframe offset of the S-RCH | 2 |
| Start RP code information of the S-RCH | 4 |
| RP code partition information for the S-RCH | 4 |
| Reserved | 3 |

TABLE 9

| Fields | Size |
|---|---|
| Allocation periodicity | 2 |
| Subframe offset | 2 |
| Start RP code information | 4 |
| RP code partition information | 4 |
| Number of the cyclic shifted RP codes per root index for NS-RCH | 2 |
| NS-RCH formats | 1 |

In Table 8, a synchronized ranging channel (S-RCH) means a channel used for initial/handover ranging as well as periodic ranging in case of femto.

Table 9 uses the same field name used in a non-femto base station mode configured to support IEEE 802.16m only and explains a method of interpreting the field name differently for a femto base station. In this case, start RP (ranging preamble) code information of the NS-RCH and RP (ranging preamble) code partition information fields can be described suitable for each usage as follows.

"Start RP code information of the NS-RCH": In case of femto, this is a parameter $k_{ns}$ indicating a start root index of a ranging preamble code ($r_{ns0}$).

"RP code partition information": In case of femto, this indicates the number of initial/handover/periodic ranging preamble codes.

Figure 2:
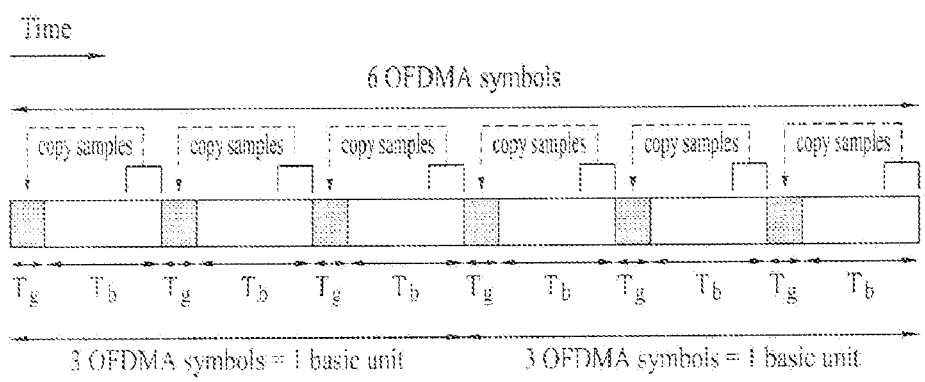
FIG. 2 is a diagram of a ranging channel structure for periodic ranging.

Moreover, having received the S-SFH shown in Table 9, if the mobile station determines that the corresponding base station is a femto base station, it may not recognize the field of the number of the cyclic shifted RP codes per root index for the NS-RCH and the field of the NS-RCH formats as special information but can ignore. This is because a cyclic shift of a different type is applicable in case of the femto base station. This is also because a ranging channel format uses the mobile station format as described with reference to FIG. 2.

In the following description, intensively explained is a case that S-RCH information for a femto base station is separately transmitted as shown in Table 8.

First of all, S-RCH information transmitted by a femto base station, as shown in Table 8, is transmitted as S-RCH information but is usable for all of initial ranging, handover ranging and periodic ranging. The informations transmitted by being included in the S-SFH can include: (1) ranging channel allocation information; (2) stat code information of ranging channel; and (3) ranging code partition information.

(1) Ranging Channel Allocation Information.

(1-1) The ranging channel allocation information can include an allocation periodicity of a ranging channel (S-RCH) for a synchronized mobile station in Table 8 and subframe offset information of the ranging channel (S-RCH) for the synchronized mobile station. According to an embodiment configured in a manner that femto ranging channel information and ranging channel information on a base station except the femto are shared, in case of not a femto base station, the ranging channel allocation periodicity and the ranging channel subframe offset information can be recognized by a mobile station as parameters indicating initial/handover ranging channel allocation periodicity. On the contrary, in case of a femto base station, a mobile station is able to check an allocation periodicity of initial/handover/periodic ranging channel and a subframe offset using a value of this field as it is.

(2) Start Code Information of Ranging Channel.

(2-1) According to one embodiment of the present invention, in case of a femto, start code information of a ranging channel can have a size equal to or greater than 4 bits to support the following matters. First of all, a femto cell needs the number of codes per cell or sector smaller than that of a non-femto cell. Secondly, if multiple femto cells are located around, more code reuse factors are necessary between cells or sectors.

(3) Ranging Code Partition Information.

(3-1) Ranging code partition information of S-SFH according to the present embodiment is proposed to include information on the number (M) of codes of a code group for periodic ranging as well as the number (O) of codes of a code group for handover ranging and the number (N) of codes of a code group for initial ranging. In particular, the ranging code partition information can include an index value within a table in which a value of each of the N, O and M is indicated by a single index. In this case, one example for the available table can be represented as follows.

TABLE 10

| Partition Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Number of initial ranging preamble codes, NIN | 4 | 4 | 4 | 4 | 8 | 8 | 8 | 8 | 16 | 16 | 16 | 16 | 24 | 24 | 24 | 24 |
| Number of hand- | 4 | 8 | 16 | 24 | 4 | 8 | 16 | 24 | 4 | 8 | 16 | 24 | 4 | 8 | 16 | 24 |

TABLE 10-continued

| Partition Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| over ranging preamble codes, NHO | | | | | | | | | | | | | | | | |
| Number of periodic ranging preamble codes, NPE | 4 | 4 | 4 | 4 | 8 | 8 | 8 | 8 | 16 | 16 | 16 | 16 | 24 | 24 | 24 | 24 |

In particular, S-SFH information according to the present invention is explained in the following description.

Figure 3:
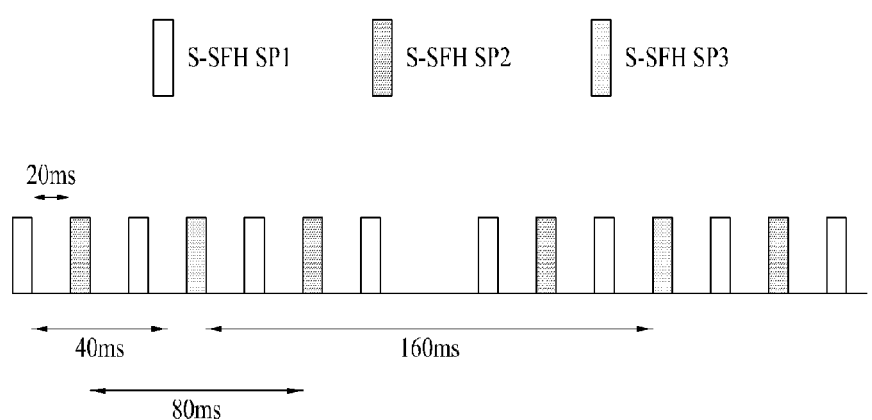
FIG. 3 is a diagram for explaining sub-packet transmission periodicity relation of S-SFH.

FIG. 3 is a diagram for explaining sub-packet transmission periodicity relation of S-SFH.

Referring to FIG. 3, a secondary super frame header (S-SFH) can be transmitted in a manner of being distributed into 3 subpackets SP1, SP2 and SP3. In this case, The S-SFH SP1 mainly includes information for network reentry. The S-SFH SP2 mainly includes information for network entry and discovery. And, the S-SFH SP3 is transmitted by including the rest of major system information. As shown in FIG. 3, the S-SFH SP1 is transmittable every 40 ms, the S-SFH SP2 is transmittable every 80 ms, and the S-SFH SP3 is transmittable every 160 ms.

According to one preferred embodiment of the present invention, the following scheme is proposed. First of all, S-SFH differing in format is transmitted according to whether a base station is a femto base station. Having received the S-SFH, a mobile station determines whether the base station is the femto base station and then obtains ranging channel information in a different format from the S-SFH according to a presence or non-presence of the femto base station.

In case that a field indicating a presence or non-presence of a femto is not explicitly included in S-SFH SP1, a mobile station reads SA-Preamble sequence soft partitioning information within S-SFH SP3 or another partition information and is then able to be aware of configurations of ranging relevant fields of the S-SFH SP1. In case that other fields are configured behind the ranging information, in order for the mobile station to interpret values of other fields (e.g., BS EIRP, Cell bar information, etc.) except the ranging relevant fields despite being unaware of the presence or non-presence of the femto after receiving the SP1, the total bit number of the ranging relevant fields within the SP1 is preferably designed to be equal.

In summary, the above-mentioned S-SFH SP1 information according to embodiments of the present invention can be represented as Table 11 and Table 12.

TABLE 11

| Syntax | Size (bit) | Notes |
|---|---|---|
| Ranging channel allocation periodicity | 2 | Indicates the periodicity of ranging channel allocation. |
| Subframe offset of ranging channel | 2 | Indicates the subframe offset ($O_{SF}$) of ranging channel allocation. The range of values is $0 \leq O_{SF} \leq 3$. |
| If ( Femtocell ) { | | |
| Start code information of ranging channel | 4 | Indicates the $k_s$ which is the parameter for start root index of ranging codes ($r_{s0}$). $r_{s0}(k_s) = [TBD] \times k_s + 1$ The range of values is $0 \leq k_s \leq 15$. |
| Ranging code partition information | 4 | Indicates the number of initial, handover and periodic codes ($N_{IN}$, $N_{HO}$ and $N_{PE}$). |
| Reserved | 3 | Reserved. |
| } else { | | |

TABLE 11-continued

| Syntax | Size (bit) | Notes |
|---|---|---|
| Start code information of ranging channel for non-synchronized AMSs | 4 | Indicates the $k_{ns}$ which is the parameter controlling the start root index of ranging preamble codes ($r_{ns0}$). $r_{ns0}(k_{ns}) = 4 \times k_{ns} + 1$ for ranging channel format 0. $r_{ns0}(k_{ns}) = 16 \times k_{ns} + 1$ for ranging channel format 1. The range of values is $0 \leq k_{ns} \leq 15$. |
| Ranging preamble code partition information for non-synchronized AMSs | 4 | Indicates the number of initial and handover ranging preamble codes ($N_{IN}$ and $N_{HO}$). |
| Number of cyclic shifted ranging preamble codes per root index for non-synchronized AMSs | 2 | Indicates the number of cyclic shifted codes per root index ($M_{ns}$) for ranging preamble codes. |
| Ranging channel formats for non-synchronized AMSs } | 1 | Indicates the ranging channel formats number |

TABLE 12

| | | |
|---|---|---|
| Femto indicator | 1 | |
| if(Femtocell) { | | for 16 m Femtocell |
| Allocation periodicity of the S-RCH | 2 | Indicates the periodicity of the S-RCH allocation. |
| Subframe offset of the S-RCH | 2 | Indicates the subframe offset ($O_{SF}$) of the S-RCH allocation. The range of values is $0 \leq O_{SF} \leq 3$. |
| Start RP code information of the S-RCH | 4 | Indicates the $k_s$ which is the parameter controlling the start root index of the RP codes ($r_{s0}$). $r_{s0} = 6 \times k_s + 1$ The range of values is $0 \leq k_s \leq 15$ |
| RP code partition information for the S-RCH | 4 | Indicates the number of initial, handover and periodic RP codes ($N_{IN}$, $N_{PE}$ and $N_{HO}$). |
| Reserved | 3 | |
| } else { | | |
| Allocation periodicity of the NS-RCH | 2 | Indicates the periodicity of the NS-RCH allocation. |
| Subframe offset of the NS-RCH | 2 | Indicates the subframe offset ($O_{SF}$) of the NS-RCH allocation. The range of values is $0 \leq O_{SF} \leq 3$. |
| Start RP code information of the NS-RCH | 4 | Indicates the $k_{ns}$ which is the parameter controlling the start root index of the RP codes ($r_{ns0}$). $r_{ns0}(k_{ns}) = 4 \times k_{ns} + 1$ for the NS-RCH format 0. $r_{ns0}(k_{ns}) = 16 \times k_{ns} + 1$ for the NS-RCH format 1. The range of values is $0 \leq k_{ns} \leq 15$. |
| RP code partition information for the NS-RCH | 4 | Indicates the number of initial and handover RP codes ($N_{IN}$ and $N_{HO}$). |
| Number of the cyclic shifted RP codes per root index for the | 2 | Indicates the number of cyclic shifted codes per root index ($M_{ns}$) for the RP codes according to the Table 896. |

TABLE 12-continued

NS-RCH
NS-RCH formats  1  Indicates the NS-RCH formats number of Table 891
}

Referring to Table 11 or Table 12, $N_{cs}$ is a unit of a cyclic shift according to a cell size. This value is identically usable for a femto (i.e., $N_{cs}=\lceil G \cdot N_{RP} \rceil$) and can be previously defined as a smaller value (i.e., $N_{CS}=\lceil G \cdot N_{RP}/2 \rceil$).

In the following description, a configuration of a mobile station (or a base station), which performs the above mentioned operations, is explained.

Figure 4:
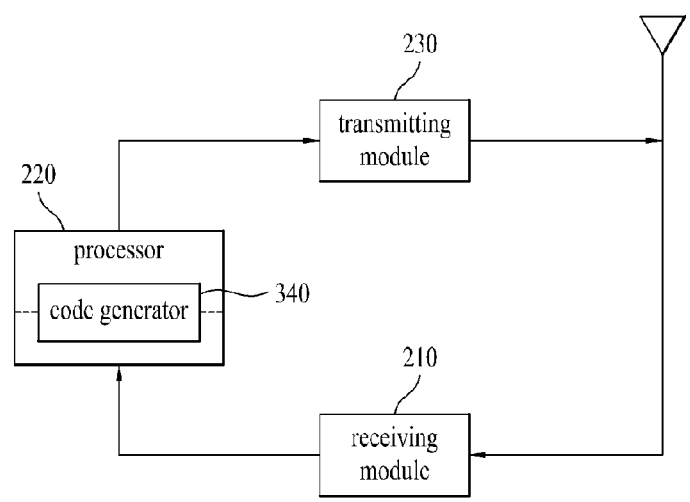
FIG. 4 is a block diagram of a mobile station device configuration according to one embodiment of the present invention.

FIG. 4 is a block diagram of a mobile station device configuration according to one embodiment of the present invention.

Referring to FIG. 4, a mobile station device, which is configured to perform ranging on a femto base station according to the present invention, can include a receiving module 210, a processor 220, a transmitting module 230 and an antenna configured to receive/transmit a signal from/to a base station. And, each of the transmitting and receiving modules 230 and 210 can be a part of the processor 220 according to its implementation. This basic configuration is identically applicable to a femto base station.

Moreover, the processor 220 of the mobile station according to one embodiment of the present invention can further include a code generator 240 configured to generate a ranging code. In this case, the code generator 240 can include a PRBS generator for ranging code generation. In particular, the processor 220 is able to control the PRBS generator to generate a ranging code using raging channel information received via S-SFH.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention is applicable to a mobile communication system.

What is claimed is:

1. A method of performing a ranging on a femto base station by a mobile station in a mobile communication system including a macro base station, the femto base station and the mobile station, the method comprising:
   receiving S-SFH (secondary superframe header) information;
   determining whether the S-SFH information relates to the femto base station;
   obtaining information on a ranging channel for a synchronized mobile station from the S-SFH, when the S-SFH information relates to the femto base station; and
   performing at least one of an initial ranging, a handover ranging and a periodic ranging on the femto base station using the information on the ranging channel for the synchronized mobile station.

2. The method of claim 1, wherein the mobile station uses the ranging channel for the synchronized mobile station for each of the initial ranging, the handover ranging and the periodic ranging.

3. The method of claim 2, wherein the information on the ranging channel for the synchronized mobile station includes ranging channel allocation information, start code information of the ranging channel and ranging code partition information.

4. The method of claim 3, wherein the ranging channel allocation information includes an allocation periodicity of the ranging channel for the synchronized mobile station and subframe offset information of the ranging channel for the synchronized mobile station.

5. The method of claim 3, wherein the ranging code partition information includes information on a number of codes (N) within a code group for the initial ranging, a number of codes (O) within a code group for the handover ranging, and a number of codes (M) within a code group for the periodic ranging.

6. The method of claim 5, wherein the ranging code partition information includes a single index indicating each of values for the number of codes (N), the number of codes (O) and the number of codes (M) within a table.

7. A mobile station device performing a ranging on a femto base station in a mobile communication system including a macro base station, the femto base station and the mobile station, the mobile station device comprising:
   an antenna configured to receive a signal from the femto base station, the antenna configured to transmit a signal to the femto base station; and
   a processor configured to process the signal received via the antenna and the signal transmitted via the antennas, the processor determining whether S-SFH (secondary superframe header) information relates to the femto base station if the antenna receiving the S-SFH information, the processor obtaining information on a ranging channel for a synchronized mobile station from the S-SFH if the S-SFH information relates to the femto base station, the processor performing at least one of an initial ranging, a handover ranging and a periodic ranging on the femto base station using the information on the ranging channel for the synchronized mobile station.

8. The mobile station device of claim 7, wherein the mobile station device uses the ranging channel for the synchronized mobile station for each of the initial ranging, the handover ranging and the periodic ranging.

9. The mobile station device of claim 8, wherein the information on the ranging channel for the synchronized mobile station includes ranging channel allocation information, start code information of the ranging channel and ranging code partition information.

10. The mobile station device of claim 8, wherein the ranging channel allocation information includes an allocation periodicity of the ranging channel for the synchronized mobile station and subframe offset information of the ranging channel for the synchronized mobile station.

11. The mobile station device of claim 8, wherein the ranging code partition information includes information on a number of codes (N) within a code group for the initial ranging, a number of code (O) within a code group for the handover ranging, and a number of codes (M) within a code group for the periodic ranging.

12. The mobile station device of claim 11, wherein the ranging code partition information includes a single index indicating each of values for the number of codes (N), the number of codes (O) and the number of codes (M) within a table.

* * * * *